United States Patent
Liu et al.

(10) Patent No.: US 10,282,040 B2
(45) Date of Patent: May 7, 2019

(54) CAPACITIVE TOUCH CIRCUIT PATTERN AND MANUFACTURING METHOD THEREOF

(75) Inventors: Chen-Yu Liu, Jhongli (CN); Ching-Yi Wang, Zhongli (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 482 days.

(21) Appl. No.: 13/256,933

(22) PCT Filed: Mar. 19, 2010

(86) PCT No.: PCT/CN2010/000334
§ 371 (c)(1),
(2), (4) Date: Oct. 17, 2011

(87) PCT Pub. No.: WO2010/105507
PCT Pub. Date: Sep. 23, 2010

(65) Prior Publication Data
US 2012/0127099 A1 May 24, 2012

(30) Foreign Application Priority Data

Mar. 20, 2009 (CN) .......................... 2009 1 0129503
Mar. 20, 2009 (CN) ..................... 2009 2 0006657 U

(51) Int. Cl.
*G06F 3/044* (2006.01)

(52) U.S. Cl.
CPC .... *G06F 3/044* (2013.01); *G06F 2203/04111* (2013.01); *Y10T 29/49105* (2015.01)

(58) Field of Classification Search
CPC . G06F 2203/04103; G06F 2203/04111; G06F 2203/04112; G06F 3/044; G06F 3/047
(Continued)

(56) References Cited

U.S. PATENT DOCUMENTS 4,028,509 A 6/1977 Zurcher
4,233,522 A 11/1980 Chalmers Ma et al.
(Continued)

FOREIGN PATENT DOCUMENTS

CN 1754141 3/2006
CN 1818842 A 8/2006
(Continued)

*Primary Examiner* — William Boddie
*Assistant Examiner* — Jeffrey Parker
(74) *Attorney, Agent, or Firm* — Cooper Legal Group, LLC

(57) ABSTRACT

The present disclosure relates to a touch circuit pattern and a manufacturing method thereof. A capacitive touch circuit pattern in the present disclosure comprises a substrate, wherein at least two adjacent transparent first-axis electrode blocks, a transparent first-axis conductive wire, and at least two adjacent transparent second-axis electrode blocks are formed on the substrate. The first-axis conductive wire is formed between the two adjacent first-axis electrode blocks to connect the two adjacent first-axis electrode blocks and the two adjacent second-axis electrode blocks, respectively, at two sides of the first-axis conductive wire. The capacitive touch circuit pattern further comprises of a metal second-axis conductive wire, which stretches across the first-axis conductive wire and connects the two adjacent second-axis electrode blocks.

44 Claims, 7 Drawing Sheets

(58) Field of Classification Search
USPC .............................. 345/173, 174, 156, 157
See application file for complete search history.

(56) References Cited

U.S. PATENT DOCUMENTS

| | | | |
|---|---|---|---|
| 4,550,221 A | 10/1985 | Mabusth | |
| 4,733,222 A | 3/1988 | Evans | |
| 5,374,787 A | 12/1994 | Miller et al. | |
| 5,381,160 A | 1/1995 | Landmeier | |
| 5,495,077 A | 2/1996 | Miller et al. | |
| 5,543,590 A | 8/1996 | Gillespie et al. | |
| 5,648,642 A | 7/1997 | Miller et al. | |
| 5,844,506 A | 12/1998 | Binstead et al. | |
| 5,880,411 A | 3/1999 | Gillespie et al. | |
| 6,005,555 A | 12/1999 | Katsurahira et al. | |
| 6,114,862 A | 9/2000 | Tartagni et al. | |
| 6,137,427 A | 10/2000 | Binstead et al. | |
| 6,177,918 B1 | 1/2001 | Colgan et al. | |
| 6,188,391 B1 | 2/2001 | Seely et al. | |
| 6,239,389 B1 | 5/2001 | Allen et al. | |
| 6,392,636 B1 | 5/2002 | Ferrari et al. | |
| 6,414,671 B1 | 7/2002 | Gillespie et al. | |
| 6,496,021 B2 | 12/2002 | Tartagni et al. | |
| 6,498,590 B1 | 12/2002 | Dietz et al. | |
| 6,664,489 B2 | 12/2003 | Kleinhans et al. | |
| 6,740,945 B2 | 5/2004 | Lepert et al. | |
| 6,924,789 B2 | 8/2005 | Bick et al. | |
| 6,970,160 B2 | 11/2005 | Mulligan et al. | |
| 7,030,860 B1 | 4/2006 | Hsu et al. | |
| 7,202,859 B1 | 4/2007 | Speck et al. | |
| 7,292,229 B2 | 11/2007 | Morag et al. | |
| 7,382,139 B2 | 6/2008 | Mackey | |
| 7,439,962 B2 | 10/2008 | Reynolds et al. | |
| 7,463,246 B2 | 12/2008 | Mackey et al. | |
| 7,477,242 B2 | 1/2009 | Cross et al. | |
| 7,532,205 B2 | 5/2009 | Gillespie et al. | |
| 7,589,713 B2 | 9/2009 | Sato | |
| 7,663,607 B2 | 2/2010 | Hotelling et al. | |
| 7,671,847 B2 | 3/2010 | Weng | |
| 7,821,502 B2 | 10/2010 | Hristov | |
| 7,864,160 B2 | 1/2011 | Geaghan et al. | |
| 7,952,564 B2 | 5/2011 | Hurst et al. | |
| 8,004,497 B2 | 8/2011 | XiaoPing | |
| 8,040,321 B2 | 10/2011 | Peng et al. | |
| 8,058,937 B2 | 11/2011 | Qin et al. | |
| 8,059,015 B2 | 11/2011 | Hua et al. | |
| 8,068,097 B2 | 11/2011 | GuangHai | |
| 8,068,186 B2 | 11/2011 | Aufderheide et al. | |
| 8,072,429 B2 | 12/2011 | Grivna | |
| 8,085,250 B2 | 12/2011 | Reynolds et al. | |
| 8,111,243 B2 | 2/2012 | Peng et al. | |
| 8,120,584 B2 | 2/2012 | Grivna et al. | |
| 8,144,125 B2 | 3/2012 | Peng et al. | |
| 8,169,421 B2 | 5/2012 | Wright et al. | |
| 8,217,902 B2 | 7/2012 | Chang et al. | |
| 2003/0048261 A1 | 3/2003 | Yamamoto et al. | |
| 2003/0234770 A1 | 12/2003 | MacKey | |
| 2004/0119701 A1 | 6/2004 | Mulligan et al. | |
| 2004/0178997 A1 | 9/2004 | Gillespie et al. | |
| 2005/0030048 A1* | 2/2005 | Bolender et al. ............ 324/661 | |
| 2006/0066581 A1 | 3/2006 | Lyon et al. | |
| 2006/0097991 A1 | 5/2006 | Hotelling et al. | |
| 2006/0274055 A1 | 12/2006 | Reynolds et al. | |
| 2007/0046648 A1 | 3/2007 | Lee et al. | |
| 2007/0132737 A1 | 6/2007 | Mulligan et al. | |
| 2007/0229469 A1 | 10/2007 | Seguine et al. | |
| 2007/0229470 A1 | 10/2007 | Snyder et al. | |
| 2007/0236618 A1 | 10/2007 | Maag et al. | |
| 2007/0240914 A1 | 10/2007 | Lai et al. | |
| 2007/0242054 A1 | 10/2007 | Chang et al. | |
| 2007/0273672 A1 | 11/2007 | Hong et al. | |
| 2008/0036473 A1 | 2/2008 | Jansson et al. | |
| 2008/0074398 A1 | 3/2008 | Wright et al. | |
| 2008/0150906 A1 | 6/2008 | Grivna et al. | |
| 2008/0180399 A1 | 7/2008 | Cheng et al. | |
| 2008/0231605 A1 | 9/2008 | Yang et al. | |
| 2008/0264699 A1 | 10/2008 | Chang et al. | |
| 2008/0314626 A1* | 12/2008 | Moore .................. G06F 3/0412 174/255 |
| 2009/0160682 A1 | 6/2009 | Bolender et al. | |
| 2009/0160824 A1* | 6/2009 | Chih-Yung et al. ........ 345/175 | |
| 2009/0277695 A1 | 11/2009 | Liu et al. | |
| 2010/0007616 A1* | 1/2010 | Jang ........................... 345/173 | |
| 2010/0045614 A1 | 2/2010 | Gray et al. | |
| 2010/0073310 A1 | 3/2010 | Liang et al. | |
| 2010/0073319 A1* | 3/2010 | Lyon et al. ................... 345/174 | |
| 2010/0079384 A1* | 4/2010 | Grivna ......................... 345/173 | |
| 2010/0156810 A1* | 6/2010 | Barbier et al. ............... 345/173 | |
| 2010/0253645 A1 | 10/2010 | Bolender | |
| 2011/0141038 A1 | 6/2011 | Kuo et al. | |
| 2012/0068968 A1 | 3/2012 | Reynolds et al. | |

FOREIGN PATENT DOCUMENTS

| | | |
|---|---|---|
| CN | 101131492 | 2/2008 |
| CN | 201078769 | 6/2008 |
| CN | 101261379 | 9/2008 |
| CN | 101324827 | 12/2008 |
| CN | 101349960 | 1/2009 |
| CN | 101359265 | 2/2009 |
| CN | 101441545 | 5/2009 |
| CN | 201298221 | 8/2009 |
| CN | 101587391 | 11/2009 |
| CN | 201374687 | 12/2009 |
| EP | 2290512 | 3/2011 |
| GB | 2168816 | 6/1986 |
| JP | 57204938 | 12/1982 |
| JP | 58166437 | 1/1983 |
| JP | 60075927 | 4/1985 |
| JP | 6184729 | 4/1986 |
| JP | 2002252340 | 9/2002 |
| JP | 2008310551 | 12/2008 |
| JP | 3149113 | 2/2009 |
| JP | 2010033478 | 2/2010 |
| JP | 2010160670 | 7/2010 |
| JP | 2011070659 | 4/2011 |
| JP | 2011198339 | 10/2011 |
| JP | 2011198839 | 10/2011 |
| JP | 2012094147 | 5/2012 |
| KR | 20070102414 A | 10/2007 |
| KR | 1020070102414 | 10/2007 |
| KR | 1020080096352 | 10/2007 |
| KR | 101040881 | 6/2011 |
| KR | 101073333 | 10/2011 |
| TW | M342558 | 10/2008 |
| TW | 345294 | 11/2008 |
| TW | 200842681 A | 11/2008 |
| TW | 200842681 A | 11/2008 |
| TW | M423866 | 3/2012 |
| WO | 2010029979 | 3/2010 |

* cited by examiner

CAPACITIVE TOUCH CIRCUIT PATTERN AND MANUFACTURING METHOD THEREOF

FIELD OF THE INVENTION

The present disclosure relates to a touch circuit pattern and a manufacturing method thereof, and more particularly to a capacitive touch circuit pattern formed on surface of a transparent substrate and a disposition technology thereof.

BACKGROUND OF THE INVENTION

Conventional touch input modes of touch panels comprise of resistive mode, capacitive mode, optical mode, electromagnetic induction mode, and acoustic wave sensing mode, etc. For the resistive mode and capacitive mode, a user touches the surface of a panel by a finger or a stylus, causing a change of voltage and current inside touch location of the panel, and then the touch location on surface of the panel can be detected so to achieve the purpose of a touch input.

In order to detect a location on a touch panel touched by a user with a finger or a stylus, those skilled in the art have developed various capacitive touch sensing technologies. For example, structure of a grid capacitive touch circuit pattern comprises two groups of capacitive sensing layers which are spaced by an intermediate insulation layer so as to form capacitance effect. Each capacitive sensing layer comprises conductive elements which are arranged substantially parallel to each other. The two capacitive sensing layers are substantially perpendicular to each other; each conductive element comprising a series of diamond-shaped electrode blocks. The conductive element is made of a transparent conductive material (such as ITO), and the electrode blocks are connected by narrow conductive wires. Conductive elements on each capacitive sensing layer are electrically connected to a surrounding circuit. A control circuit provides signals to two groups of conductive elements respectively, via the surrounding circuits and can receive touch signals generated by electrode blocks when a surface is touched so as to determine the touch location on each layer.

Moreover, the method of manufacturing a conventional capacitive touch circuit pattern structure includes forming a plurality of electrode blocks of a first group of capacitive sensing layer through the first processing. A surrounding circuit is formed through a second process such that the surrounding circuit is connected to the electrode blocks of the first group of capacitive sensing layer, to form a whole insulation layer through a third process. A plurality of electrode blocks of a second group of capacitive sensing layer are formed through a fourth process and another surrounding circuit is formed through a fifth process. Finally the surrounding circuit is connected to the electrode blocks of the second group of the capacitive sensing layer. The shortcoming in this procedure is that for making the electrode blocks of the two groups of the capacitive sensing layers, the insulation layer and the two groups of surrounding circuits must be formed through the above disclosed five processing steps, which makes the overall process very complex. Conductive wires used for connecting the electrode blocks are made of ITO, which further makes it difficult to effectively reduce the impedance between the electrode blocks and the surrounding circuits.

Thus, there exists a need to improve sensitivity of signal transmission between the electrode blocks and the surrounding circuits.

SUMMARY OF THE INVENTION

An object of the present disclosure is to provide a capacitive touch circuit pattern and a manufacturing method for completing formation of electrode blocks along two axial directions together through a single process so as to simplify the process of disposing the touch circuit pattern.

In another embodiment, a capacitive touch circuit pattern in the present disclosure comprises:
a substrate, wherein at least two adjacent transparent first-axis electrode blocks, a transparent first-axis conductive wire and at least two adjacent transparent second-axis electrode blocks are formed on the substrate;
wherein the first-axis conductive wire is formed between the two adjacent first-axis electrode blocks to connect the two adjacent first-axis electrode blocks and the two adjacent second-axis electrode blocks, respectively, at two sides of the first-axis conductive wire;
a metal second-axis conductive wire, which stretches across the first-axis conductive wire and connects the two adjacent second-axis electrode blocks;
an insulation spacer, which is formed between the first-axis conductive wire and the second-axis conductive wire such that the first-axis conductive wire and the second-axis conductive wire are electrically insulated;
wherein a first-axis surrounding circuit and a second-axis surrounding circuit are, respectively, formed at two adjacent edges of the substrate, the first-axis surrounding circuit connecting the first-axis electrode blocks and the second-axis surrounding circuit connecting the second-axis electrode blocks.

The present disclosure also provides a method of manufacturing a capacitive touch circuit pattern comprising of:
forming two adjacent first-axis electrode blocks, a first-axis conductive wire and two adjacent second-axis electrode blocks on surface of a substrate through a first process;
wherein the first-axis conductive wire is disposed between the two adjacent first-axis electrode blocks to connect the two adjacent first-axis electrode blocks;
wherein the two adjacent second-axis electrode blocks are disposed, respectively, at two sides of the first-axis conductive wire;
forming an insulation layer on the surface of the substrate to cover the first-axis conductive wire through a second process;
forming a metal second-axis conductive wire on the insulation layer to connect the two adjacent second-axis electrode blocks through a third process such that the first-axis conductive wire and the second-axis conductive wire are electrically insulated and thus a touch circuit pattern is formed.

The method further comprises forming a first-axis surrounding circuit and a second-axis surrounding circuit, respectively, at two adjacent edges of the substrate at the same time when forming the second-axis conductive wire so that the first-axis surrounding circuit connects the first-axis electrode blocks and the second-axis surrounding circuit connects the second-axis electrode blocks.

The insulation layer is an insulation spacer and the second-axis conductive wire stretches across the insulation spacer. The insulation layer can also cover the two adjacent first-axis electrode blocks and the two adjacent second-axis electrode blocks. There are two adjacent through-holes on the surface of the insulation layer, which are respectively formed above the two adjacent second-axis electrode blocks. The second-axis conductive wire is located between the two adjacent through-holes and is superposed on the two adjacent through-holes to connect the two adjacent second-axis electrode blocks.

Another method of manufacturing a capacitive touch circuit pattern comprises:

forming a metal second-axis conductive wire on surface of a substrate through a first process;

forming an insulation layer on the surface of the substrate to cover the second-axis conductive wire through a second process;

forming two adjacent first-axis electrode blocks, a first-axis conductive wire, and two adjacent second-axis electrode blocks on the substrate through a third process;

wherein the two adjacent second-axis electrode blocks respectively connect to two ends of the second-axis conductive wire;

wherein the two adjacent first-axis electrode blocks are disposed respectively at two sides of the second-axis conductive wire;

wherein the first-axis conductive wire is located on the insulation layer and connects the two adjacent first-axis electrode blocks so that the first-axis conductive wire and the second-axis conductive wire are electrically insulated to form a touch circuit pattern.

The method further comprises forming a first-axis surrounding circuit and a second-axis surrounding circuit, respectively, at two adjacent edges of the substrate at the same time when forming the second-axis conductive wire so that the first-axis electrode blocks connect the first-axis surrounding circuit and the second-axis electrode blocks connect the second-axis surrounding circuit.

The insulation layer is an insulation spacer and the first-axis conductive wire stretches across the insulation spacer. There are two adjacent through-holes on the surface of the insulation layer, which are respectively formed above the two ends of the second-axis conductive wire. The two adjacent first-axis electrode blocks and the two adjacent second-axis electrode blocks are located on the insulation layer, and the two adjacent second-axis electrode blocks are superposed on the through-holes to connect the two ends of the second-axis conductive wire, respectively.

In order to achieve the purpose, the present disclosure also provides a capacitive touch circuit pattern structure, which comprises: a substrate, wherein at least two adjacent transparent first-axis electrode blocks, a transparent first-axis conductive wire and at least two adjacent transparent second-axis electrode blocks are formed on the substrate. The first-axis conductive wire is formed between the two adjacent first-axis electrode blocks to connect the two adjacent first-axis electrode blocks. The two adjacent second-axis electrode blocks are disposed at two sides of the first-axis conductive wire; a metal second-axis conductive wire, which stretches across the first-axis conductive wire and connects the two adjacent second-axis electrode blocks An insulation spacer is formed between the first-axis conductive wire and the second-axis conductive wire such that the first-axis conductive wire and the second-axis conductive wire are electrically insulated.

Further, a first-axis surrounding circuit and a second-axis surrounding circuit are respectively, formed at two adjacent edges of the substrate, the first-axis surrounding circuit connecting the first-axis electrode blocks and the second-axis surrounding circuit connecting the second-axis electrode blocks.

The present disclosure further provides a capacitive touch circuit pattern structure, which comprises: a substrate, wherein at least two adjacent transparent first-axis electrode blocks, a transparent first-axis conductive wire and at least two adjacent transparent second-axis electrode blocks are formed on the substrate. The first-axis conductive wire is formed between the two adjacent first-axis electrode blocks to connect the two adjacent first-axis electrode blocks, and the two adjacent second-axis electrode blocks are disposed respectively at two sides of the first-axis conductive wire; a metal second-axis conductive wire; which stretches across the first-axis conductive wire and connects the two adjacent second-axis electrode blocks; and an insulation layer, which is formed on the surface of the substrate and filled among the two first-axis electrode blocks, the first-axis conductive wire, the two second-axis electrode blocks, and the second-axis conductive wire so that the first-axis conductive wire and the second-axis conductive wire are electrically insulated.

Optionally, there are two adjacent through-holes on the surface of the insulation layer, wherein the two through-holes, respectively, correspond to the two adjacent second-axis electrode blocks. The second-axis conductive wire is located between the two adjacent through-holes and is superposed on the two adjacent through-holes to connect the two adjacent second-axis electrode blocks.

Optionally, a first-axis surrounding circuit and a second-axis surrounding circuit, are respectively, formed at two adjacent edges of the substrate, the first-axis surrounding circuit connecting the first-axis electrode blocks and the second-axis surrounding circuit connecting the second-axis electrode blocks.

The present disclosure further provides a method of manufacturing a capacitive touch circuit pattern structure of a touch display screen on a substrate, which comprises:

at least one group of first electrode blocks, wherein each group comprises at least two first electrode blocks arranged at intervals along a first-axis direction;

at least one group of first conductive wires, wherein each group is disposed between the adjacent first electrode blocks in a same group of the first electrode blocks and is used for electrically connecting the first electrode blocks in the same group;

at least one group of second electrode blocks, wherein each group comprises at least two second electrode blocks arranged at intervals along a second-axis direction, corresponding to the interval between the two adjacent first electrode blocks, wherein the two adjacent second electrode blocks are disposed respectively at two sides of the first conductive wires;

an insulation layer formed on the substrate to cover at least part of the first conductive wires; and at least one group of second conductive wires formed on the substrate, wherein the second conductive wires are made of a non-transparent conductive material, further wherein each group of the second conductive wires is disposed between the adjacent second electrode blocks in a same group of the second electrode blocks and is used for electrically connecting the second electrode blocks in the same group, further wherein the first conductive wires and the second conductive wires are electrically insulated by means of an insulation layer.

The method further comprises: forming a first surrounding circuit and a second surrounding circuit, respectively, at edges of the surface of the substrate at the same time when forming the second conductive wires so that the first surrounding circuit is electrically connected to the first electrode blocks and the second surrounding circuit is electrically connected to the second electrode blocks.

The first surrounding circuit and the second surrounding circuit are made of non-transparent conductive material.

The non-transparent conductive material is a metal.

Optionally, the insulation layer comprises one or more insulation spacers arranged at intervals, and the second conductive wires stretch across the corresponding insulation spacers.

Optionally, the insulation layer is an integral structure covering at least part of the first electrode blocks and the second electrode blocks. There is at least one pair of through-holes on the insulation layer, wherein each pair of through-holes is superposed on the two adjacent second electrode blocks in a same group such that each hole is superposed on one of the second electrode blocks. The at least one second conductive wire is disposed between the pair of through-holes and is extended and superposed on the pair of through-holes so as to electrically connect the two adjacent second electrode blocks in at least one group of second electrode blocks.

The second conductive wires formed in a same group can be extended into one wire.

The present disclosure further provides a method of manufacturing a capacitive touch circuit pattern structure of a touch display screen on a substrate, which comprises:

forming at least one group of second conductive wires on a substrate, wherein the second conductive wires are disposed along a second-axis direction and are made of non-transparent conductive material;

forming an insulation layer on the substrate to cover part of at least one group of second conductive wires;

forming at least one group of second electrode blocks, wherein each group comprises at least two second electrode blocks arranged at intervals along the second-axis direction such that each group of the second conductive wires is disposed between the adjacent second electrode blocks in a same group of the second electrode blocks and the second electrode blocks in the same group are electrically connected via the second conductive wires;

forming at least one group of first electrode blocks, wherein each group comprises at least two first electrode blocks arranged at intervals along a first-axis direction, wherein the interval corresponds to the interval between the two adjacent second electrode blocks, further wherein the two adjacent first electrode blocks are disposed respectively at two sides of the second conductive wires; and forming at least one group of first conductive wires, wherein each group is disposed between the adjacent first electrode blocks in a same group of the first electrode blocks and is used for electrically connecting the first electrode blocks in the same group, wherein the first conductive wires and the second conductive wires are electrically insulated by means of the insulation layer.

The method further comprises: forming a first surrounding circuit and a second surrounding circuit, respectively, at edges of the surface of the substrate at the same time when forming the second conductive wires so that the first surrounding circuit is electrically connected to the first electrode blocks and the second surrounding circuit is electrically connected to the second electrode blocks.

The first surrounding circuit and the second surrounding circuit are made of non-transparent conductive material.

The non-transparent conductive material is a metal.

Optionally, the insulation layer comprises one or more insulation spacers arranged at intervals, and the first conductive wires stretch across the corresponding insulation spacers.

Optionally, the insulation layer is an integral structure which has at least one pair of through-holes, wherein the pair of through-holes is superposed on the same second conductive wire. The first and second electrode blocks are located on the insulation layer, and the two adjacent second electrode blocks in a same group are superposed on the pair of through-holes in such a manner that it is are electrically connected via a second conductive wire.

The second conductive wires formed in a same group are extended into one wire.

The present disclosure further provides a capacitive touch circuit pattern structure of a touch panel used in a touch display screen, which is formed on a substrate by the above mentioned method. The capacitive touch circuit pattern structure comprises of:

at least one group of transparent first electrode blocks, wherein each group comprises of at least two first electrode blocks arranged at intervals along a first-axis direction;

at least one group of transparent first conductive wires, wherein each group is disposed between the adjacent first electrode blocks in a same group of the first electrode blocks and is used for electrically connecting the first electrode blocks in the same group;

at least one group of transparent second electrode blocks, wherein each group comprises at least two second electrode blocks arranged at intervals along a second-axis direction, corresponding to the interval between the two adjacent first electrode blocks, wherein the two adjacent second electrode blocks are disposed, respectively, at two sides of at least one group of first conductive wires;

at least one group of second conductive wires which are made of a non-transparent conductive material, wherein each group is disposed between the adjacent second electrode blocks in a same group of the second electrode blocks and is used for electrically connecting the second electrode blocks in the same group; and an insulation layer, which is formed between the first conductive wires and the second conductive wires so that the first conductive wires and the second conductive wires are electrically insulated.

The capacitive touch circuit pattern structure further comprises a first surrounding circuit and a second surrounding circuit on edges of the surface of the substrate, wherein the first surrounding circuit is electrically connected to the first electrode blocks, and the second surrounding circuit is electrically connected to the second electrode blocks.

The first surrounding circuit and the second surrounding circuit are made of non-transparent conductive material.

The non-transparent conductive material is a metal.

Optionally, the insulation layer comprises one or more insulation spacers arranged at intervals, and the second conductive wires stretches across the corresponding insulation spacers.

Optionally, the insulation layer is an integral structure covering at least part of the first electrode blocks and the second electrode blocks, and there is at least one pair of through-holes on the insulation layer, wherein the pair of through-holes is superposed on the two adjacent second electrode blocks in a same group. At least one second conductive wire is disposed between the pair of through-holes and is extended and superposed on the pair of through-holes so as to electrically connect the two adjacent second electrode blocks in at least one group of second electrode blocks.

In an embodiment, second conductive wires in a same group can be extended into one wire.

In order to achieve the purpose, the present disclosure also provides a touch panel which is used in a touch display screen, wherein the touch panel comprises of a substrate and a capacitive touch circuit pattern structure formed on the substrate in accordance with the present disclosure.

The second conductive wires are aligned with a black matrix inside the touch display screen.

In order to achieve the purpose, the present disclosure also provides a touch display screen, which comprises the touch panel in accordance with the present disclosure.

The capacitive touch circuit pattern structure of a touch panel is formed between upper and lower substrate of a display panel of the touch display screen, wherein second conductive wires are disposed as shading elements in the display panel.

The touch panel is located above the display panel of the touch display screen.

Plurality of first-axis and second-axis electrode blocks of the present disclosure can be formed through a single process, which can simplify the process of disposing the touch circuit pattern.

DETAILED DESCRIPTION OF THE EMBODIMENTS

Detailed description of the present disclosure will be combined with the drawings.

Figure 1:
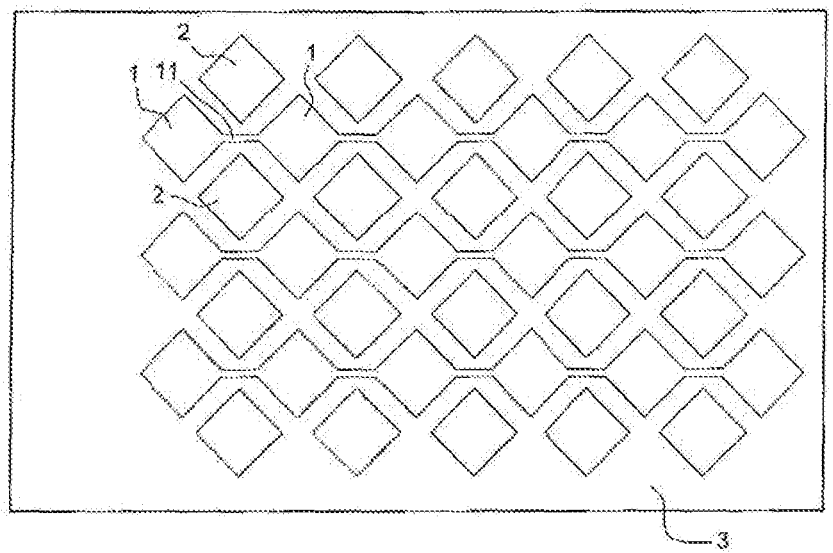
FIG. 1~FIG. 3 are schematic views of implementing steps in accordance with a preferred embodiment of the present disclosure.
Figure 2:
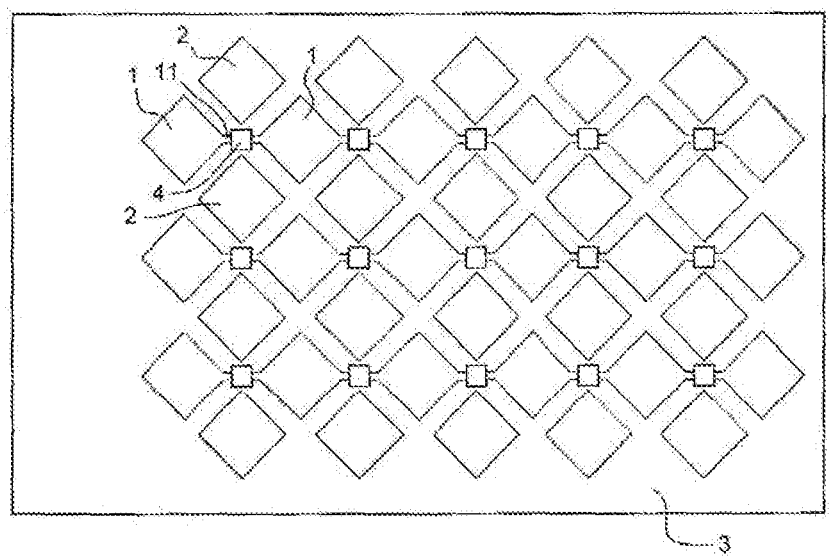
Figure 3:
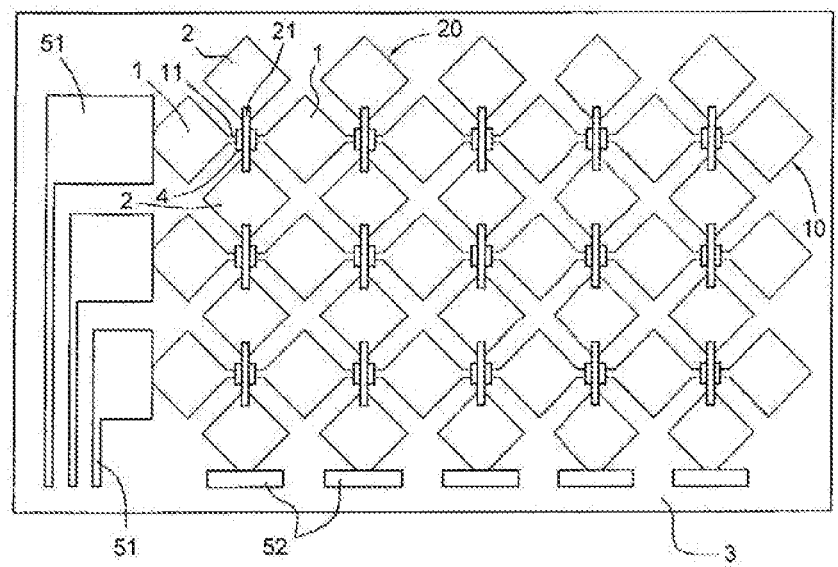

Illustratively, FIG. 3 discloses a plan view of a capacitive touch circuit pattern in accordance with the present disclosure and combining with FIG. 1 and FIG. 2, it can be seen that the present disclosure forms at least two adjacent transparent first-axis electrode blocks 1, a transparent first-axis conductive wire 11, and at least two adjacent transparent second-axis electrode blocks 2 on the surface of a substrate 3. The first-axis conductive wire 11 is formed between the two adjacent first-axis electrode blocks 1 to connect the two adjacent first-axis electrode blocks 1. The two adjacent second-axis electrode blocks 2 are disposed, respectively, at two sides of the first-axis conductive wire 11, and a second-axis conductive wire 21, which is Made of a metal material, connects the two adjacent second-axis electrode blocks 2 and stretches across the first-axis conductive wire 11. An insulation spacer 4 is formed between the first-axis conductive wire 11 and the second-axis conductive wire 21 so that the first-axis conductive wire 11 and the second-axis conductive wire 21 are electrically insulated.

A first-axis surrounding circuit 51 and a second-axis surrounding circuit 52 (as shown in FIG. 3) are respectively formed at two adjacent edges of the substrate 3, wherein the first-axis surrounding circuit 51 connects the first-axis electrode blocks 1, and the second-axis surrounding circuit 52 connects the second-axis electrode blocks 2. For the method of manufacturing a capacitive touch circuit pattern, photolithographic processing can be adopted in the present embodiment, comprising the following steps:

(1) forming two adjacent first-axis electrode blocks 1, a first-axis conductive wire 11 and two adjacent second-axis electrode blocks 2 (as shown in FIG. 1) on the surface of a transparent substrate 3 through the first photolithographic processing, wherein the first-axis conductive wire 11 is disposed between the two adjacent first-axis electrode blocks 1 to connect the two adjacent first-axis electrode blocks 1, further wherein the two adjacent second-axis electrode blocks 2 are disposed, respectively, at two sides of the first-axis conductive wire 11, further wherein the first-axis electrode blocks 1, the second-axis electrode blocks 2, and the first-axis conductive wire 11 are made of a transparent conductive material and the transparent conductive material can be ITO;

wherein the first-axis electrode blocks 1, the second-axis electrode blocks 2, and the first-axis conductive wire 11 can be respectively formed with multiple groups in the present embodiment, wherein the plurality of first-axis electrode blocks 1 are parallel to each other and arranged at intervals as a matrix and the plurality of second-axis electrode blocks 2 are also parallel to each other and arranged at intervals as a matrix, which makes the plurality of first-axis conductive wires 11 also arranged at intervals as a matrix;

(2) based on locations of the plurality of first-axis electrode blocks 1, the second-axis electrode blocks 2, and the first-axis conductive wires 11, forming an insulation spacer 4 (as shown in FIG. 2) on the surface of the substrate 3 to cover the first-axis conductive wires 11 through a second photolithographic process, wherein the insulation spacer 4 can be made of a transparent insulation material, wherein the insulation material can be silicon oxide or other equivalent materials which have the capability of insulation. The insulation spacer 4 can also be formed with multiple groups in the present embodiment and arranged at intervals as a matrix;

(3) based on the location of the insulation spacer 4, forming a second-axis conductive wire 21 which is made of a metal material, a first-axis surrounding circuit 51, and a second-axis surrounding circuit 52 (as shown in FIG. 3) on the surface of the substrate 3 through a third photolithographic process, wherein the second-axis conductive wire 21 is connected between the two adjacent second-axis electrode blocks 2 and stretches across the insulation spacer 4 so that the first-axis conductive wire 11 and the second-axis conductive wire 21 are electrically insulated, wherein the first-axis surrounding circuit 51 and the second-axis surrounding circuit 52 are disposed, respectively, at two adjacent edges of the substrate 3 so that the first-axis surrounding circuit 51 connects the first-axis electrode blocks 1 and the second-axis surrounding circuit 52 connects the second-axis electrode blocks 2.

Figure 4:
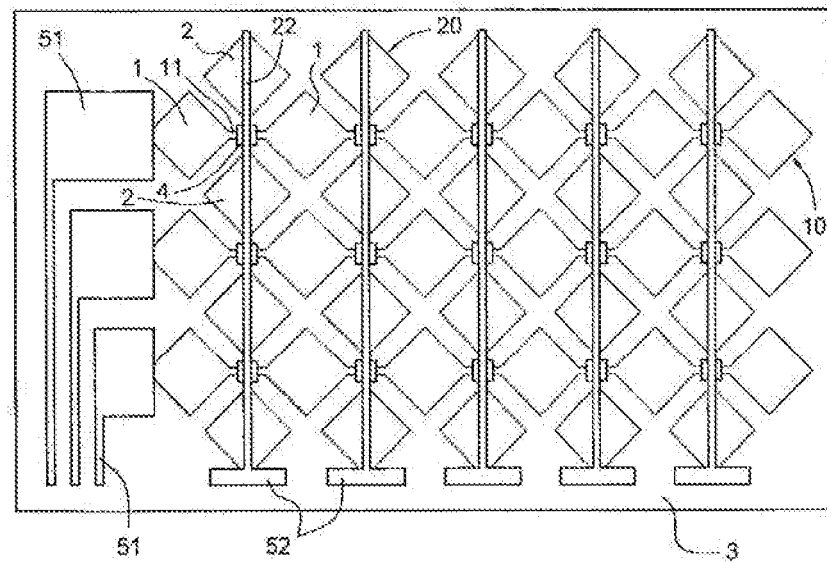
FIG. 4 is a schematic view of an additional implementing form in accordance with another embodiment of the present disclosure.

The second-axis conductive wire 21, the first-axis surrounding circuit 51 and, the second-axis surrounding circuit 52 can be made of gold, silver, copper, aluminum or any other metal materials with good conductivity. The second-axis conductive wire 21, the first-axis surrounding circuit 51, and the second-axis surrounding circuit 52 can be formed with multiple groups in the present embodiment. The second-axis conductive wire 22 can serially connect a plurality of second-axis electrode blocks 2 by a superposition method (as shown in FIG. 4).

Thus, the first-axis electrode blocks 1 and the first-axis conductive wire 11 form a first-axis conductive element 10 and all first-axis conductive elements 10 form a capacitive sensing layer. The second-axis electrode blocks 2 and the second-axis conductive wire 21 form a second-axis conductive element 20 and all the second-axis conductive elements 20 form the other capacitive sensing layer. The capacitive sensing layers, the insulation spacers 4, and the surrounding circuits 51 and 52 form a touch circuit pattern (as shown in FIG. 3 and FIG. 4). The substrate 3 can be made of glass, plastic or any other transparent insulation material.

The capacitive touch circuit pattern structure of the present disclosure can be applied to a touch panel of a touch display screen. The touch panel comprises a substrate and a capacitive touch circuit pattern structure formed on the substrate in accordance with the present disclosure.

The touch panel can be superposed on a display panel of the touch display screen. The display panel comprises an upper substrate, a lower substrate, a pixel unit disposed between the upper and lower substrates, and a black matrix used for shading light. Preferably, the second conductive wires which are made of non-transparent conductive material in the capacitive touch circuit pattern structure are aligned with the black matrix inside the touch display screen so as to improve transmittance of the light emitted by the display panel.

When the touch circuit pattern of the present disclosure is applied to a display panel, the touch circuit pattern structure can be disposed under the upper substrate or above the lower substrate of the display panel so as to use the upper substrate or lower substrate of the display panel as a substrate of the touch panel. The second-axis conductive wires 21 and 22 can overlap with a shading layer which is used for shading light and formed by several black matrixes arranged inside the display panel. The shading layer can be omitted, using the second-axis conductive wires 21 and 22 as shading elements of the display panel, and the second-axis conductive wires 21 and 22, which are made of a metal material, can reduce the impedance between the second-axis electrode blocks 2 and the second-axis surrounding circuit 52 so as to improve sensitivity of the signal transmission between the electrode blocks and the surrounding circuits. On comparing the present disclosure with the conventional design of a whole insulation layer, the design of arranging the plurality of insulation spacers 4 at intervals as a matrix has the effect of improving the transmittance of the panel.

In accordance with the preferred embodiments it can be seen that the first-axis electrode blocks 1 and the second-axis electrode blocks 2 can be formed on the surface of the transparent substrate 3 through a single process. The touch circuit pattern can be completed through a third process, which simplifies the photolithographic processing of disposing the touch circuit pattern.

Figure 5:
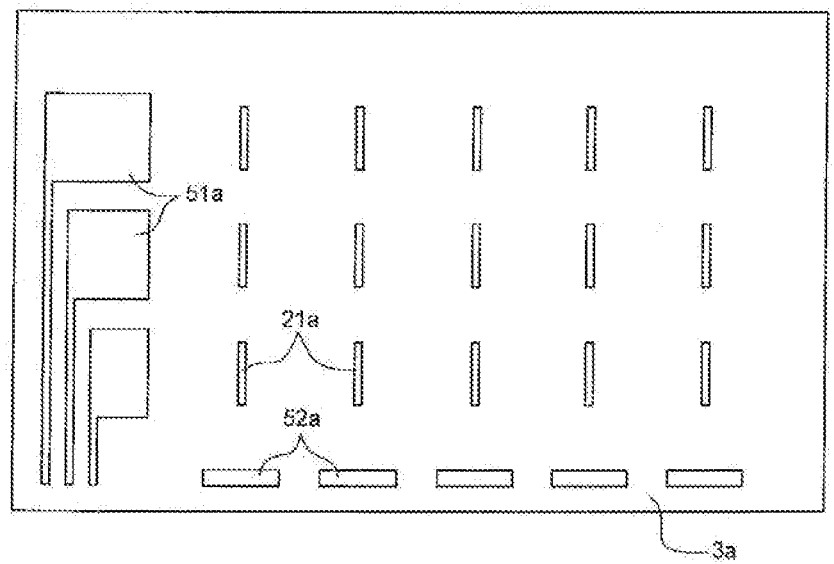
FIG. 5~FIG. 7 are schematic views of implementing steps in accordance with another embodiment of the present disclosure.
Figure 6:
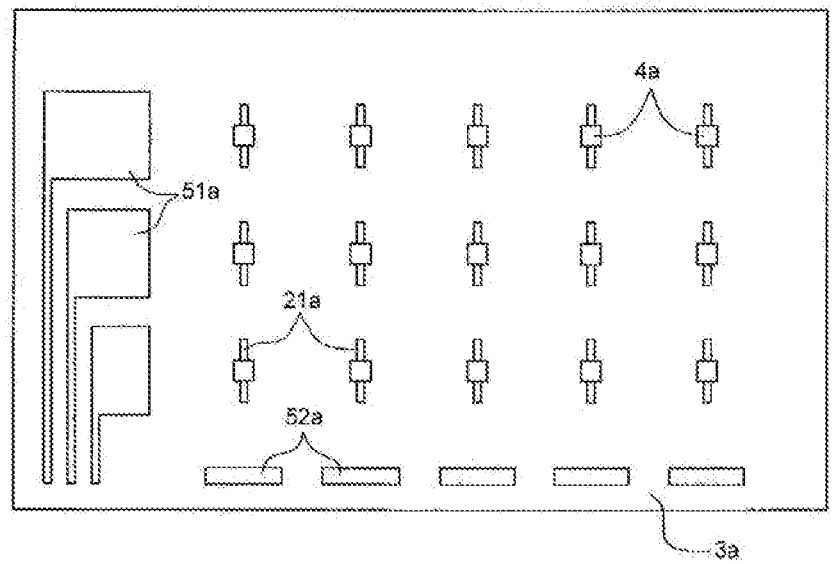
Figure 7:
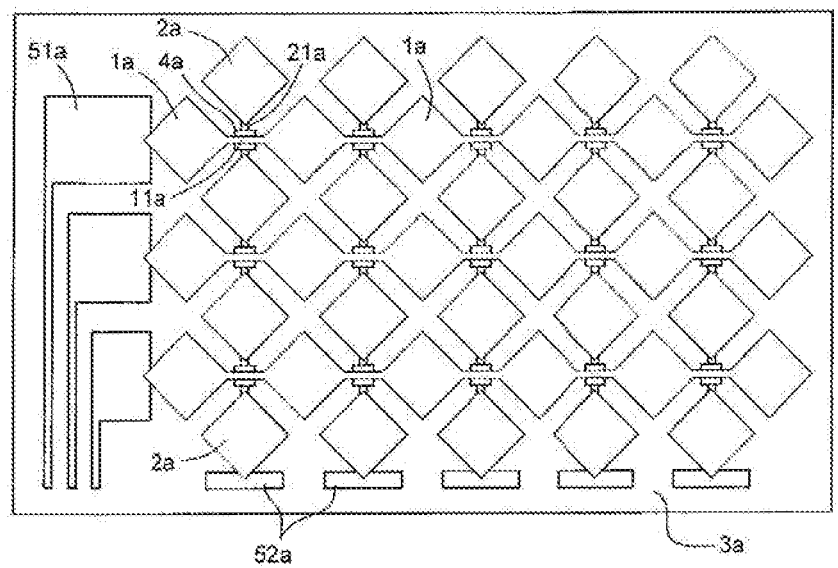

Referring to FIG. 7 which discloses a plan view of another capacitive touch circuit pattern in accordance with the preferred embodiments of the present disclosure, disposition form of this circuit pattern is similar to FIG. 3, with the difference being in the order of elements formed on the surface of the substrate. For the method of manufacturing the capacitive touch circuit pattern, photolithographic processing can be adopted in the present embodiment, comprising the following steps:

(1) forming a second-axis conductive wire 21a which is made of a metal material, a first-axis surrounding circuit 51a and a second-axis surrounding circuit 52a (as shown in FIG. 5) on the surface of the substrate 3a through the first photolithographic processing, wherein the second-axis conductive wire 21a, the first-axis surrounding circuit 51a, and the second-axis surrounding circuit 52a can be, respectively, formed with multiple groups in the present embodiment; and wherein all the second-axis conductive wires 21a are disposed into arrays;

(2) based on the location of the second-axis conductive wire 21a, forming an insulation spacer 4a (as shown in FIG. 6) on the surface of the substrate 3a to cover the second-axis conductive wire 21a through the second photolithographic processing, wherein the insulation spacer 4a can be formed with multiple groups in the present embodiment;

(3) based on the locations of the second-axis conductive wire 21a, the insulation spacer 4a, the first-axis surrounding circuit 51a, and the second-axis surrounding circuit 52a, forming two adjacent first-axis electrode blocks 1a, a first-axis conductive wire 11a and two adjacent second-axis electrode blocks 2a (as shown in FIG. 7) on the surface of the substrate 3a through a third photolithographic process, wherein the two adjacent second-axis electrode blocks 2a are respectively connected to the two ends of the second-axis conductive wire 21a, further wherein the two first-axis electrode blocks 1a are disposed respectively at two sides of the second-axis conductive wire 21a; and wherein the first-axis conductive wire 11a stretches across the insulation spacer 4a and connects the two adjacent first-axis electrode blocks 1a so that the first-axis conductive wire 11a and the second-axis conductive wire 21a are electrically insulated.

The first-axis electrode blocks 1a, the second-axis electrode blocks 2a, and the first-axis conductive wire 11a can be respectively formed with multiple groups in the present embodiment so that the plurality of first-axis electrode blocks 1a and the second-axis electrode blocks 2a form a touch circuit pattern, and formation and implementing modes of other elements are the same as the above embodiment shown in FIG. 1~FIG. 3.

Figure 8:
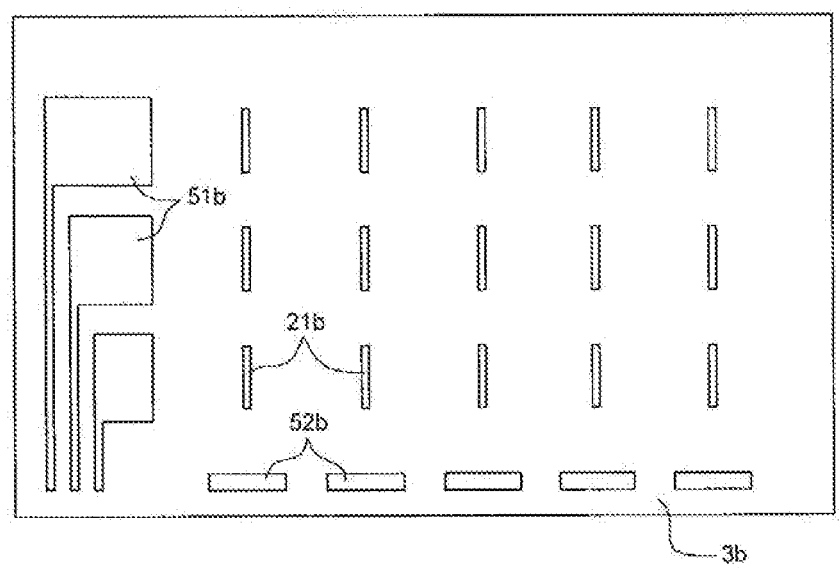
FIG. 8~FIG. 10 are schematic views of implementing steps in accordance with another embodiment of the present disclosure.
Figure 9:
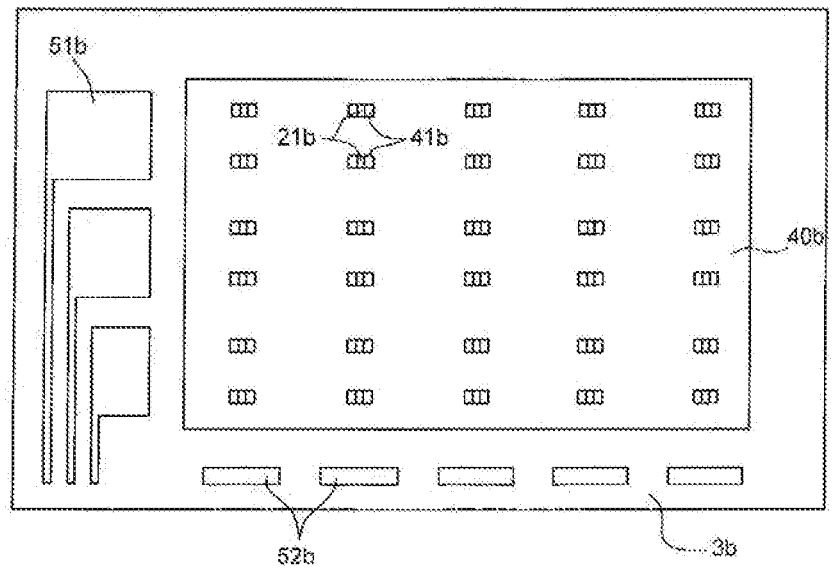
Figure 10:
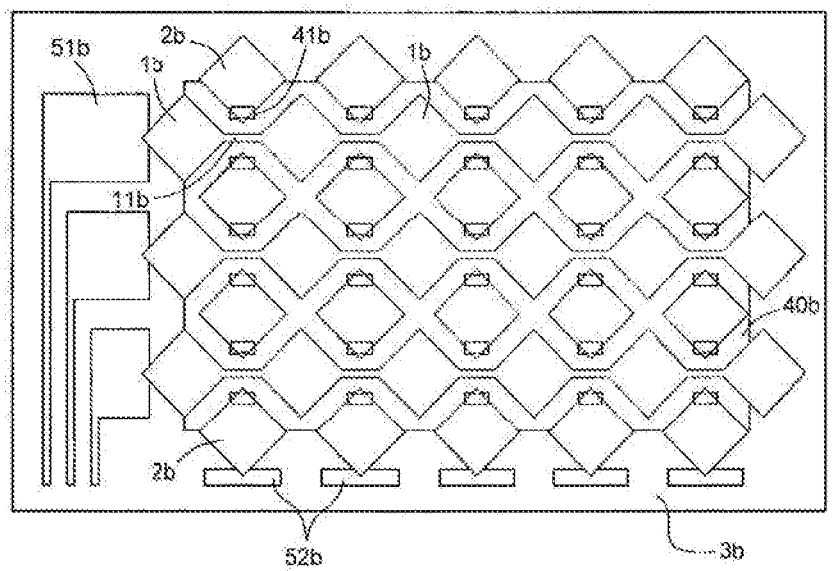

Referring to FIG. 10 which discloses a plan view of another capacitive touch circuit pattern in accordance with the present disclosure and combining with FIG. 8 and FIG. 9, it can be seen that the present disclosure forms two adjacent first-axis electrode blocks 1b, a first-axis conductive wire 11b and two adjacent second-axis electrode blocks 2b on a substrate 3b. The first-axis conductive wire 11b is formed between the two adjacent first-axis electrode blocks 1b to connect the two adjacent first-axis electrode blocks 1b. The two adjacent second-axis electrode blocks 2b are disposed respectively at two sides of the first-axis conductive wire 11b. The second-axis conductive wire 21b, which is made of a metal material, connects the two adjacent second-axis electrode blocks 2b and stretches across the first-axis conductive wire 11b. An insulation layer 40b is formed on the surface of the substrate 3b and filled among the first-axis electrode blocks 1b, the second-axis electrode blocks 2b, the first-axis conductive wire 11b, and the second-axis conductive wire 21*b* so that the first-axis conductive wire 11*b* and the second-axis conductive wire 21*b* are electrically insulated.

A first-axis surrounding circuit 51*b* and a second-axis surrounding circuit 52*b* are, respectively, formed at two adjacent edges of the substrate 3*b*, wherein the first-axis surrounding circuit 51*b* connects the first-axis electrode blocks 1*b* and the second-axis surrounding circuit 52*b* connects the second-axis electrode blocks 2*b*. For the method of manufacturing the capacitive touch circuit pattern, photolithographic processing can be adopted in the present embodiment, comprising the following steps:

(1) forming a second-axis conductive wire 21*b* which is made of a metal material, a first-axis surrounding circuit 51*b* and a second-axis surrounding circuit 52*b* (as shown in FIG. 8) on the surface of the substrate 3*b* through a first photolithographic process, wherein the second-axis conductive wire 21*b*, the first-axis surrounding circuit 51*b*, and the second-axis surrounding circuit 52*b* can be, respectively, are formed with multiple groups in the present embodiment;

(2) based on the location of the second-axis conductive wire 21*b*, forming an insulation layer 40*b* (as shown in FIG. 9) on the surface of the substrate 3*b* through a second photolithographic process, wherein there are two adjacent through-holes 41*b* on the surface of the insulation layer 40*b*, which are respectively formed above the two ends of the second-axis conductive wire 21*b*; wherein the insulation layer 40*b* can be made of a transparent insulation material and the insulation material can be silicon oxide or other equivalent materials which have the capability of insulation, and the two adjacent through-holes can be formed with multiple groups in the present embodiment;

(3) based on the locations of the two adjacent through-holes 41*b*, forming two adjacent first-axis electrode blocks 1*b*, a first-axis conductive wire 11*b*, and two adjacent second-axis electrode blocks 2*b* (as shown in FIG. 10) on the insulation layer 40*b* on the surface of the substrate 3*b* through a third photolithographic process; wherein the two adjacent second-axis electrode blocks 2*b* are, respectively, superposed on the through-holes 41*b* on the surface of the insulation layer 40*b* and are, respectively, connected to the two ends of the second-axis conductive wire 21*b*, wherein the two adjacent first-axis electrode blocks 1*b* are disposed, respectively, at two sides of the two through-holes 41*b*, further wherein the first-axis conductive wire 11*b* is formed on the surface of the insulation layer 40*b* between the two through-holes 41*b* and connects the two adjacent first-axis electrode blocks 1*b* so that the first-axis conductive wire 11*b* and the second-axis conductive wire 21*b* are electrically insulated.

The first-axis electrode blocks 1*b*, the second-axis electrode blocks 2*b*, and the first-axis conductive wire 11*b* can be, respectively, formed with multiple groups in the present embodiment so that the plurality of the first-axis electrode blocks 1*b* and the second-axis electrode blocks 2*b* form a touch circuit pattern, and formation and implementing modes of other elements are the same as the above embodiment shown in FIG. 1~FIG. 3.

Figure 11:
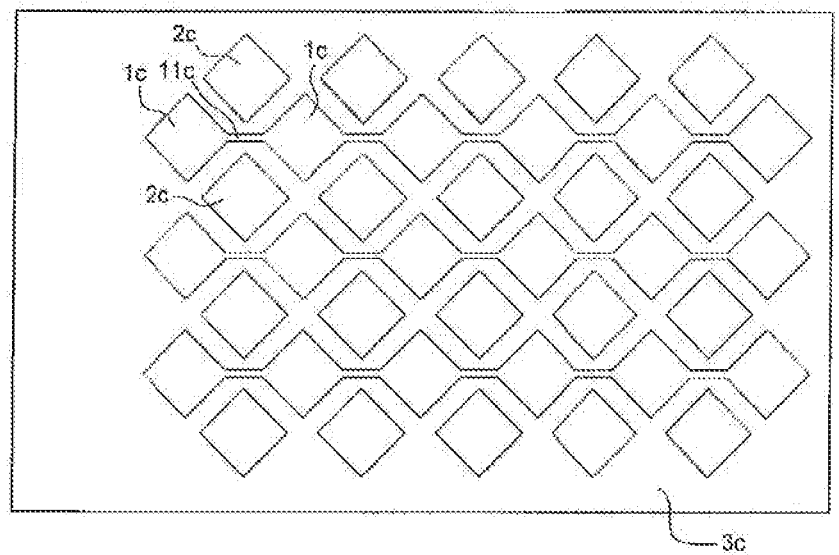
FIG. 11~FIG. 13 are schematic views of implementing steps in accordance with another embodiment of the present disclosure.
Figure 12:
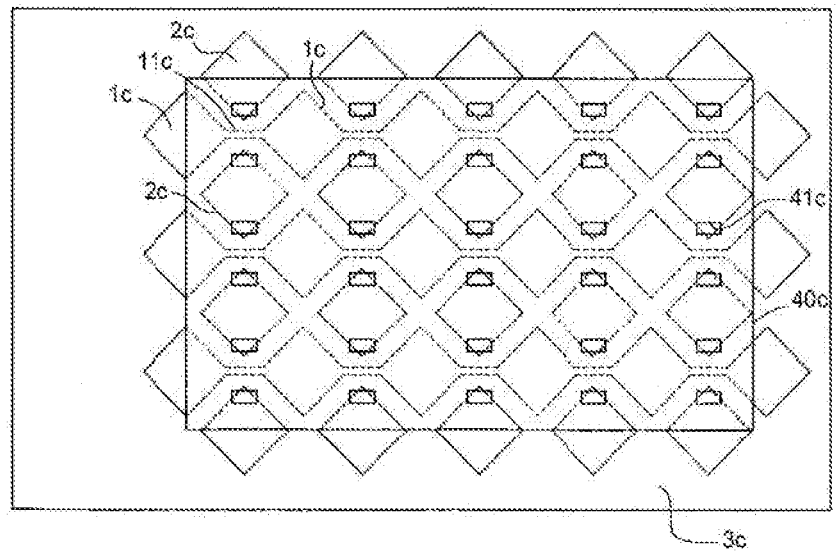
Figure 13:
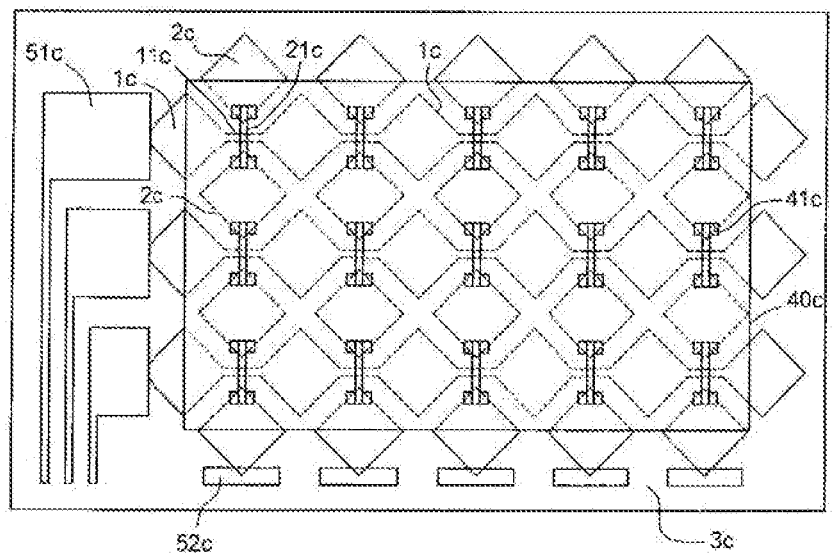

Referring to FIG. 13 which discloses a plan view of another capacitive touch circuit pattern in accordance with the present disclosure, its disposition form is similar to FIG. 10 and the difference is only the order of elements formed on the surface of the substrate. For the method of manufacturing the capacitive touch circuit pattern, photolithographic processing can be adopted in the present embodiment, comprising the following steps:

(1) forming two adjacent first-axis electrode blocks 1*c*, a first-axis conductive wire 11*c* and two adjacent second-axis electrode blocks 2*c* (as shown in FIG. 11) on the surface of a transparent substrate 3*c* through a first photolithographic process; wherein the first-axis conductive wire 11*c* is disposed between the two adjacent first-axis electrode blocks 1*c* to connect the two adjacent first-axis electrode blocks 1*c*, wherein the two adjacent second-axis electrode blocks 2*c* are disposed, respectively, at two sides of the first-axis conductive wire 11*c*, further wherein the first-axis electrode blocks 1*c*, the second-axis electrode blocks 2*c*, and the first-axis conductive wire 11*c* can be respectively formed with multiple groups in the present embodiment; and wherein the plurality of first-axis electrode blocks 1*c* are parallel to each other and arranged at intervals as a matrix and the plurality of second-axis electrode blocks 2*c* are also parallel to each other and arranged at intervals as a matrix;

(2) based on the locations of the plurality of first-axis electrode blocks 1*c*, the second-axis electrode blocks 2*c*, and the first-axis conductive wires 11*c*, forming an insulation spacer 40*c* (as shown in FIG. 12) on the surface of the substrate 3*c* to cover the first-axis electrode blocks 1*c*, the second-axis electrode blocks 2*c* and the first-axis conductive wires 11*c* through a second photolithographic process, wherein there are two adjacent through-holes 41*c* on the surface of the insulation layer 40*c*, which are respectively formed above the second-axis electrode blocks 2*c*, and the two adjacent through-holes 41*c* can be formed with multiple groups in the present embodiment;

(3) based on the locations of the two adjacent through-holes 41*c*, forming a second-axis conductive wire, 21*c* which is made of a metal material, a first-axis surrounding circuit 51*c*, and a second-axis surrounding circuit 52*c* (as shown in FIG. 13) on the surface of the substrate 3*c* through a third photolithographic process, wherein the second-axis conductive wire 21*c* is located on the surface of the insulation layer 40*c* between the two adjacent through-holes 41*c* and is superposed on the two adjacent through-holes 41*c* to connect the two adjacent second-axis electrode blocks 2*c* so that the first-axis conductive wire 11*c* and the second-axis conductive wire 21*c* are electrically insulated, further wherein the first-axis surrounding circuit 51*c* and the second-axis surrounding circuit 52*c* are disposed, respectively, at two adjacent edges of the substrate 3*c* so that the first-axis surrounding circuit 51*c* connects the first-axis electrode blocks 1*c* and the second-axis surrounding circuit 52*c* connects the second-axis electrode blocks 2*c*.

The second-axis conductive wire 21*c*, the first-axis surrounding circuit 51*c* and the second-axis surrounding circuit 52*c* can be respectively, formed with multiple groups in the present embodiment so that the plurality of first-axis electrode blocks 1*c* and the second-axis electrode blocks 2*c* form a touch circuit pattern, and formation and implementing modes of other elements are the same as the above embodiment as shown in FIG. 8~FIG. 10.

Although it is disclosed that the second-axis conductive wire, the first-axis surrounding circuit, and the second-axis surrounding circuit can be made of a metal material, according to the present disclosure, the second-axis conductive wire, the first-axis surrounding circuit, and/or the second-axis surrounding circuit can also be made from other non-transparent conductive materials.

Although the present disclosure refers to the embodiments and the best modes for carrying out the present disclosure, it is apparent to those skilled in the art that a variety of modifications and changes may be made without departing from the scope of the present disclosure, which is intended to be defined by the appended claims.

What is claimed is:

1. A method of manufacturing a capacitive touch circuit pattern, comprising:
    simultaneously forming two adjacent transparent first-axis electrode blocks, a transparent first-axis conductive wire, and two adjacent transparent second-axis electrode blocks on a surface of a substrate through a first process, wherein:
        the transparent first-axis conductive wire is disposed between the two adjacent transparent first-axis electrode blocks to connect the two adjacent transparent first-axis electrode blocks, and
        the two adjacent transparent second-axis electrode blocks are disposed on opposite sides of the transparent first-axis conductive wire;
    forming an insulation layer only on a surface of the transparent first-axis conductive wire through a second process, wherein the two adjacent transparent second-axis electrode blocks are exposed from the insulation layer, and the two adjacent transparent first-axis electrode blocks are exposed from the insulation layer; and
    simultaneously forming a first-axis surrounding circuit, a second-axis surrounding circuit and a metal second-axis conductive wire through a third process, wherein:
        the metal second-axis conductive wire is directly formed on the two adjacent transparent second-axis electrode blocks,
        the metal second-axis conductive wire extends across a first transparent second-axis electrode block of the two adjacent transparent second-axis electrode blocks from a first end of the first transparent second-axis electrode block facing the transparent first-axis conductive wire to a second end of the first transparent second-axis electrode block diametrically opposite the first end,
        a part of the metal second-axis conductive wire crosses the insulating layer, and
        the metal second-axis conductive wire and the second-axis surrounding circuit are integrally formed as a T-shaped structure; and
        wherein a surface of either one of the two adjacent transparent second-axis electrode blocks, that are exposed from the insulation layer, comprises a first surface portion exposed from the metal second-axis conductive wire, a second surface portion covered by the metal second-axis conductive wire, and a third surface portion exposed from the metal second-axis conductive wire, and wherein the first surface portion and the third surface portion are formed on opposite sides of the second surface portion.

2. The method of manufacturing a capacitive touch circuit pattern as claimed in claim 1, wherein:
    the first-axis surrounding circuit is formed at a first edge of the substrate and the second-axis surrounding circuit is formed at a second edge of the substrate that is adjacent to the first edge, and
    the two adjacent transparent first-axis electrode blocks connect to the first-axis surrounding circuit and the two adjacent transparent second-axis electrode blocks connect to the second-axis surrounding circuit.

3. The method of manufacturing a capacitive touch circuit pattern as claimed in claim 1, wherein the metal second-axis conductive wire extends continuously from the first end of the first transparent second-axis electrode block to the second end of the first transparent second-axis electrode block.

4. The method of manufacturing a capacitive touch circuit pattern as claimed in claim 1, wherein a longest dimension of the second-axis surrounding circuit extends in a first direction and a longest dimension of the metal second-axis conductive wire extends in a second direction perpendicular to the first direction.

5. The method of manufacturing a capacitive touch circuit pattern as claimed in claim 1, wherein the substrate is made of glass or plastic, and wherein the first-axis surrounding circuit, the second-axis surrounding circuit and the metal second-axis conductive wire are made of gold, silver, copper, or aluminum.

6. A capacitive touch circuit pattern structure, comprising:
    two adjacent transparent first-axis electrode blocks;
    a transparent first-axis conductive wire;
    two adjacent transparent second-axis electrode blocks, wherein:
        the two adjacent transparent first-axis electrode blocks, the transparent first-axis conductive wire, and the two adjacent transparent second-axis electrode blocks are simultaneously formed on a substrate,
        the transparent first-axis conductive wire is formed between the two adjacent transparent first-axis electrode blocks to connect the two adjacent transparent first-axis electrode blocks, and
        the two adjacent transparent second-axis electrode blocks are disposed on opposite sides of the transparent first-axis conductive wire;
    a first-axis surrounding circuit;
    a second-axis surrounding circuit;
    a metal second-axis conductive wire, wherein:
        the first-axis surrounding circuit, the second-axis surrounding circuit and the metal second-axis conductive wire are simultaneously formed, and
        the metal second-axis conductive wire connects the two adjacent transparent second-axis electrode blocks; and
    an insulation spacer only formed on a surface of the transparent first-axis conductive wire, and formed between the transparent first-axis conductive wire and the metal second-axis conductive wire to electrically insulate the transparent first-axis conductive wire from the metal second-axis conductive wire, wherein:
        the two adjacent transparent second-axis electrode blocks are exposed from the insulation spacer, and the two adjacent transparent first-axis electrode blocks are exposed from the insulation spacer,
        the metal second-axis conductive wire is directly formed on the two adjacent transparent second-axis electrode blocks,
        the metal second-axis conductive wire extends across a first transparent second-axis electrode block of the two adjacent transparent second-axis electrode blocks from a first end of the first transparent second-axis electrode block facing the transparent first-axis conductive wire to a second end of the first transparent second-axis electrode block diametrically opposite the first end, a part of the metal second-axis conductive wire crosses the insulation spacer, and the metal second-axis conductive wire and the second-axis surrounding circuit are integrally formed as a T-shaped structure; and wherein a surface of either one of the two adjacent transparent second-axis electrode blocks, that are exposed from the insulation spacer, comprises a first surface portion exposed from the metal second-axis conductive wire, a second surface portion covered by the metal second-axis conductive wire, and a third surface portion exposed from the metal second-axis conductive wire, and wherein the first surface portion and the third surface portion are formed on opposite sides of the second surface portion.

7. The capacitive touch circuit pattern structure as claimed in claim 6, wherein:

the first-axis surrounding circuit and the second-axis surrounding circuit are formed at edges of the substrate, the first-axis surrounding circuit connects to the two adjacent transparent first-axis electrode blocks, and the second-axis surrounding circuit connects to the two adjacent transparent second-axis electrode blocks.

8. The capacitive touch circuit pattern structure as claimed in claim 6, wherein the metal second-axis conductive wire extends continuously from the first end of the first transparent second-axis electrode block to the second end of the first transparent second-axis electrode block.

9. The capacitive touch circuit pattern structure as claimed in claim 6, further comprising a third transparent second-axis electrode block adjacent one of the two adjacent transparent second-axis electrode blocks, wherein the metal second-axis conductive wire extends continuously across the two adjacent transparent second-axis electrode blocks and the third transparent second-axis electrode block.

10. The capacitive touch circuit pattern structure as claimed in claim 6, wherein a longest dimension of the second-axis surrounding circuit extends in a first direction and a longest dimension of the metal second-axis conductive wire extends in a second direction perpendicular to the first direction.

11. The capacitive touch circuit pattern structure as claimed in claim 6, wherein the substrate is made of glass or plastic, and wherein the first-axis surrounding circuit, the second-axis surrounding circuit and the metal second-axis conductive wire are made of gold, silver, copper, or aluminum.

12. A touch display screen, comprising:

a display panel, comprising an upper substrate, a lower substrate, and a pixel unit disposed between the upper substrate and the lower substrate; and a capacitive touch circuit pattern structure applied to one of the upper substrate or the lower substrate, wherein the capacitive touch circuit pattern structure comprises:

two adjacent transparent first-axis electrode blocks disposed on the one of the upper substrate or the lower substrate;

a transparent first-axis conductive wire disposed on the one of the upper substrate or the lower substrate;

two adjacent transparent second-axis electrode blocks disposed on the one of the upper substrate or the lower substrate, wherein:

the transparent first-axis conductive wire is formed between the two adjacent transparent first-axis electrode blocks to connect the two adjacent transparent first-axis electrode blocks, and the two adjacent transparent second-axis electrode blocks are disposed on opposite sides of the transparent first-axis conductive wire;

a second-axis surrounding circuit;

a second-axis conductive wire, wherein the second-axis conductive wire connects the two adjacent transparent second-axis electrode blocks; and an insulation spacer only formed on a surface of the transparent first-axis conductive wire, and formed between the transparent first-axis conductive wire and the second-axis conductive wire to electrically insulate the transparent first-axis conductive wire from the second-axis conductive wire, wherein:

the two adjacent transparent second-axis electrode blocks are exposed from the insulation spacer, and the two adjacent transparent first-axis electrode blocks are exposed from the insulation spacer, the second-axis conductive wire contact the two adjacent transparent second-axis electrode blocks, the second-axis conductive wire extends across a first transparent second-axis electrode block of the two adjacent transparent second-axis electrode blocks from a first end of the first transparent second-axis electrode block facing the transparent first-axis conductive wire to a second end of the first transparent second-axis electrode block diametrically opposite the first end, a part of the second-axis conductive wire crosses the insulation spacer, and the second-axis conductive wire and the second-axis surrounding circuit are integrally formed as a T-shaped structure; and wherein a surface of either one of the two adjacent transparent second-axis electrode blocks, that are exposed from the insulation spacer, comprises a first surface portion exposed from the second-axis conductive wire, a second surface portion covered by the second-axis conductive wire, and a third surface portion exposed from the second-axis conductive wire, and wherein the first surface portion and the third surface portion are formed on opposite sides of the second surface portion.

13. The touch display screen as claimed in claim 12, wherein the second-axis conductive wire is made of a non-transparent conductive material.

14. The touch display screen as claimed in claim 13, wherein:

the capacitive touch circuit pattern structure is disposed between the upper substrate and the lower substrate, and the second-axis conductive wire is disposed as a shading element in the display panel.

15. The touch display screen as claimed in claim 12, wherein:

the display panel further comprises a black matrix, and the second-axis conductive wire is aligned with the black matrix.

16. The touch display screen as claimed in claim 12, wherein the second-axis conductive wire is metal.

17. The touch display screen as claimed in claim 12, wherein the two adjacent transparent first-axis electrode blocks, the transparent first-axis conductive wire, and the two adjacent transparent second-axis electrode blocks are simultaneously formed on the one of the upper substrate or the lower substrate.

18. The touch display screen as claimed in claim 12, further comprising a first-axis surrounding circuit, wherein the first-axis surrounding circuit, the second-axis surrounding circuit and the second-axis conductive wire are simultaneously formed.

19. The touch display screen as claimed in claim 18, wherein the upper substrate or the lower substrate is made of glass or plastic, and wherein the first-axis surrounding circuit, the second-axis surrounding circuit and the second-axis conductive wire are made of gold, silver, copper, or aluminum.

20. The touch display screen as claimed in claim 12, wherein the second-axis conductive wire extends continuously from the first end of the first transparent second-axis electrode block to the second end of the first transparent second-axis electrode block.

21. The touch display screen as claimed in claim 12, wherein a longest dimension of the second-axis surrounding circuit extends in a first direction and a longest dimension of the second-axis conductive wire extends in a second direction perpendicular to the first direction.

22. A method of manufacturing a capacitive touch circuit pattern, comprising:
    simultaneously forming two adjacent transparent first-axis electrode blocks, a transparent first-axis conductive wire, and two adjacent transparent second-axis electrode blocks on a surface of a substrate through a first process, wherein:
        the transparent first-axis conductive wire is disposed between the two adjacent transparent first-axis electrode blocks to connect the two adjacent transparent first-axis electrode blocks, and
        the two adjacent transparent second-axis electrode blocks are disposed on opposite sides of the transparent first-axis conductive wire;
    forming an insulation layer only on a surface of the transparent first-axis conductive wire through a second process, wherein the two adjacent transparent first-axis electrode blocks are exposed from the insulation layer, and the two adjacent transparent second-axis electrode blocks are exposed from the insulation layer; and
    simultaneously forming a first-axis surrounding circuit, a second-axis surrounding circuit and a second-axis conductive wire through a third process, wherein:
        the second-axis conductive wire is directly formed on the two adjacent transparent second-axis electrode blocks,
        the second-axis conductive wire extends across a first transparent second-axis electrode block of the two adjacent transparent second-axis electrode blocks from a first end of the first transparent second-axis electrode block facing the transparent first-axis conductive wire to a second end of the first transparent second-axis electrode block diametrically opposite the first end, and
        a part of the second-axis conductive wire crosses the insulating layer; and
        wherein a surface of either one of the two adjacent transparent second-axis electrode blocks, that are exposed from the insulation layer, comprises a first surface portion exposed from the second-axis conductive wire, a second surface portion covered by the second-axis conductive wire, and a third surface portion exposed from the second-axis conductive wire, and wherein the first surface portion and the third surface portion are formed on opposite sides of the second surface portion.

23. The method of manufacturing a capacitive touch circuit pattern as claimed in claim 22, wherein the second-axis conductive wire and the second-axis surrounding circuit are integrally formed as a T-shaped structure.

24. The method of manufacturing a capacitive touch circuit pattern as claimed in claim 23, wherein a longest dimension of the second-axis surrounding circuit extends in a first direction and a longest dimension of the second-axis conductive wire extends in a second direction perpendicular to the first direction.

25. The method of manufacturing a capacitive touch circuit pattern as claimed in claim 24, wherein the two adjacent transparent first-axis electrode blocks are arranged along the first direction and the two adjacent transparent second-axis electrode blocks are arranged along the second direction.

26. The method of manufacturing a capacitive touch circuit pattern as claimed in claim 22, wherein the second-axis conductive wire is metal.

27. The method of manufacturing a capacitive touch circuit pattern as claimed in claim 22, wherein:
    the first-axis surrounding circuit and the second-axis surrounding circuit are formed at edges of the substrate,
    the first-axis surrounding circuit connects to the two adjacent transparent first-axis electrode blocks, and
    the second-axis surrounding circuit connects to the two adjacent transparent second-axis electrode blocks.

28. The method of manufacturing a capacitive touch circuit pattern as claimed in claim 22, wherein the second-axis conductive wire, the first-axis surrounding circuit and the second-axis surrounding circuit are made of a non-transparent conductive material.

29. The method of manufacturing a capacitive touch circuit pattern as claimed in claim 28, wherein the non-transparent conductive material is a metal.

30. The method of manufacturing a capacitive touch circuit pattern as claimed in claim 22, wherein the second-axis conductive wire extends continuously from the first end of the first transparent second-axis electrode block to the second end of the first transparent second-axis electrode block.

31. The method of manufacturing a capacitive touch circuit pattern as claimed in claim 22, wherein the substrate is made of glass or plastic, and wherein the first-axis surrounding circuit, the second-axis surrounding circuit and the second-axis conductive wire are made of gold, silver, copper, or aluminum.

32. A capacitive touch circuit pattern structure, comprising:
    two adjacent transparent first-axis electrode blocks;
    a transparent first-axis conductive wire;
    two adjacent transparent second-axis electrode blocks, wherein:
        the transparent first-axis conductive wire is disposed between the two adjacent transparent first-axis electrode blocks to connect the two adjacent transparent first-axis electrode blocks, and
        the two adjacent transparent second-axis electrode blocks are disposed on opposite sides of the transparent first-axis conductive wire;
    a second-axis conductive wire, wherein the second-axis conductive wire connects the two adjacent transparent second-axis electrode blocks;
    an insulation spacer only disposed on a surface of the transparent first-axis conductive wire, and disposed between the transparent first-axis conductive wire and the second-axis conductive wire to electrically insulate the transparent first-axis conductive wire from the second-axis conductive wire, wherein the second-axis conductive wire extends across a first transparent second-axis electrode block of the two adjacent transparent second-axis electrode blocks from a first end of the first transparent second-axis electrode block facing the transparent first-axis conductive wire to a second end of the first transparent second-axis electrode block diametrically opposite the first end, and wherein the two adjacent transparent first-axis electrode blocks are exposed from the insulation spacer, and the two adjacent transparent second-axis electrode blocks are exposed from the insulation spacer; and a second-axis surrounding circuit, wherein the second-axis conductive wire and the second-axis surrounding circuit are integrally formed as a T-shaped structure; and wherein a surface of either one of the two adjacent transparent second-axis electrode blocks, that are exposed from the insulation spacer, comprises a first surface portion exposed from the second-axis conductive wire, a second surface portion covered by the second-axis conductive wire, and a third surface portion exposed from the second-axis conductive wire, and wherein the first surface portion and the third surface portion are formed on opposite sides of the second surface portion.

33. The capacitive touch circuit pattern structure as claimed in claim 32, wherein a part of the second-axis conductive wire crosses the insulation spacer.

34. The capacitive touch circuit pattern structure as claimed in claim 32, wherein a longest dimension of the second-axis surrounding circuit extends in a first direction and a longest dimension of the second-axis conductive wire extends in a second direction perpendicular to the first direction.

35. The capacitive touch circuit pattern structure as claimed in claim 34, wherein the two adjacent transparent first-axis electrode blocks are arranged along the first direction and the two adjacent transparent second-axis electrode blocks are arranged along the second direction.

36. The capacitive touch circuit pattern structure as claimed in claim 32, wherein the two adjacent transparent first-axis electrode blocks, the transparent first-axis conductive wire, and the two adjacent transparent second-axis electrode blocks are simultaneously formed on a substrate.

37. The capacitive touch circuit pattern structure as claimed in claim 32, wherein the second-axis conductive wire is metal.

38. The capacitive touch circuit pattern structure as claimed in claim 32, further comprising a first-axis surrounding circuit, wherein the first-axis surrounding circuit, the second-axis surrounding circuit and the second-axis conductive wire are simultaneously formed on a substrate.

39. The capacitive touch circuit pattern structure as claimed in claim 38, wherein the substrate is made of glass or plastic, and wherein the first-axis surrounding circuit, the second-axis surrounding circuit and the second-axis conductive wire are made of gold, silver, copper, or aluminum.

40. The capacitive touch circuit pattern structure as claimed in claim 32, wherein the second-axis conductive wire is directly formed on the two adjacent transparent second-axis electrode blocks.

41. The capacitive touch circuit pattern structure as claimed in claim 32, wherein the second-axis conductive wire is made of a non-transparent conductive material.

42. The capacitive touch circuit pattern structure as claimed in claim 32, further comprising a first-axis surrounding circuit, wherein:
the first-axis surrounding circuit is electrically connected to the two adjacent transparent first-axis electrode blocks, and
the second-axis surrounding circuit is electrically connected to the two adjacent transparent second-axis electrode blocks.

43. The capacitive touch circuit pattern structure as claimed in claim 42, wherein the first-axis surrounding circuit and the second-axis surrounding circuit are made of a non-transparent conductive material.

44. The capacitive touch circuit pattern structure as claimed in claim 32, wherein the second-axis conductive wire extends continuously from the first end of the first transparent second-axis electrode block to the second end of the first transparent second-axis electrode block.

* * * * *